(12) United States Patent
Umeno et al.

(10) Patent No.: US 9,232,116 B2
(45) Date of Patent: Jan. 5, 2016

(54) DIGITAL BROADCAST RECEIVING APPARATUS AND DIGITAL BROADCAST RECEIVING METHOD

(71) Applicants: Ryosuke Umeno, Tokyo (JP); Yuji Matsuda, Tokyo (JP)

(72) Inventors: Ryosuke Umeno, Tokyo (JP); Yuji Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/427,269

(22) PCT Filed: Oct. 24, 2012

(86) PCT No.: PCT/JP2012/077476
§ 371 (c)(1),
(2) Date: Mar. 10, 2015

(87) PCT Pub. No.: WO2014/064781
PCT Pub. Date: May 1, 2014

(65) Prior Publication Data
US 2015/0249773 A1       Sep. 3, 2015

(51) Int. Cl.
*H04N 5/06*    (2006.01)
*H04N 5/455*   (2006.01)
*H04N 21/43*   (2011.01)

(52) U.S. Cl.
CPC ............... *H04N 5/06* (2013.01); *H04N 5/455* (2013.01); *H04N 21/4305* (2013.01)

(58) Field of Classification Search
CPC ....... H04N 5/06; H04N 5/455; H04N 5/4401; H04N 21/4382; H04N 5/04; H04N 21/4305; H04N 5/126; H04N 7/0135

USPC .......... 348/512, 500, 516, 518, 524, 725–728
IPC ............................ H04N 5/06,5/455, 5/44, 5/04
See application file for complete search history.

(56) References Cited

U.S. PATENT DOCUMENTS

| | | | |
|---|---|---|---|
| 2002/0145680 A1* | 10/2002 | Hong | H04N 5/04 348/725 |
| 2002/0159350 A1* | 10/2002 | Ogura | G11B 20/10 369/47.35 |
| 2004/0061530 A1* | 4/2004 | Tanigawa | H04N 21/4305 326/93 |

FOREIGN PATENT DOCUMENTS

| | | |
|---|---|---|
| JP | 5-219037 A | 8/1993 |
| JP | 6-21928 A | 1/1994 |
| JP | 6-97899 A | 4/1994 |
| JP | 2003-258784 A | 9/2003 |
| JP | 2005-184383 A | 7/2005 |

* cited by examiner

*Primary Examiner* — Sherrie Hsia
(74) *Attorney, Agent, or Firm* — Birch, Stewart, Kolasch & Birch, LLP

(57) ABSTRACT

A digital broadcast receiving apparatus includes a digital data demodulator 1 that demodulates digital data from a received signal of a digital broadcast; a content reproduction unit 2 that reproduces contents of the digital broadcast from the demodulated digital data; a clock difference detector 3 that detects information about the difference between a first clock to which the digital data demodulator 1 synchronizes and a second clock to which the content reproduction unit 2 synchronizes; and an output sample controller 6 that performs control in such a manner that the contents of the digital broadcast reproduced are output at a prescribed rate in accordance with the information about the difference between the first clock and the second clock.

6 Claims, 7 Drawing Sheets

DIGITAL BROADCAST RECEIVING APPARATUS AND DIGITAL BROADCAST RECEIVING METHOD

TECHNICAL FIELD

The present invention relates to a digital broadcast receiving apparatus and a digital broadcast receiving method, which receive a digital broadcast and reproduce its video and audio contents.

BACKGROUND ART

In a digital broadcast receiving apparatus, unless video and audio contents reproduced from the received signal are output at the same constant rate as that of a transmission side, it cannot offer stable, consistent video and audio because of malfunctioning like distortion. Thus generally, the transmission side superposes information about reference time on a data stream, and the receiving side carries out sequential control of the reproduction timing of the contents in accordance with the information about the reference time extracted from the data stream.

For example, a communication terminal described in a Patent Document 1 comprises a receiving unit that receives a data stream, and a reproduction unit that restores the contents from the output of the receiving unit at a prescribed bit rate, in which the reproduction unit demodulates the data stream from the received signal, and reproduces content data in accordance with the reference time superposed on the data stream. This enables stable, consistent reproduction of the video and audio contents.

PRIOR ART DOCUMENT

Patent Document

Patent Document 1: Japanese Patent Laid-Open No. 2003-258784.

DISCLOSURE OF THE INVENTION

Problems to be Solved by the Invention

The conventional technique represented by the Patent Document 1 supposes that the information about the reference time is superposed on the data stream. Accordingly, unless the information about the reference time is superposed, it offers a problem of being unable to output the reproduced contents of the digital broadcast at the same constant rate as that of the transmission side.

Incidentally, when not using the reference time, for example, it is conceivable to operate the receiving unit and reproduction unit according to a common clock that synchronizes with the transmission side clock or according to a clock with a multiple-frequency thereof.

More specifically, since the receiving unit has a demodulation function of the received signal, it can primarily reproduce the clock synchronized to the transmission side. Accordingly, if the receiving unit reproduces the clock synchronized with the transmission side, and supplies the clock or the clock with a multiple-frequency thereof to the reproduction unit, this will enable the receiving unit and the reproduction unit to operate in synchronization with the transmission side.

However, when the receiving unit and the reproduction unit cannot be operated according to the same clock because of the configuration of the receiving unit and the reproduction unit such as that the receiving unit and the reproduction unit are built in separate chips operating according to different clocks from each other, the contents of the digital broadcast cannot be output at the same constant rate as that of the transmission side, which is unlikely to achieve the desired performance.

The present invention is implemented to solve the foregoing problem. Therefore it is an object of the present invention to provide a digital broadcast receiving apparatus and a digital broadcast receiving method capable of outputting the contents of the digital broadcast at a prescribed rate.

Means for Solving the Problem

A digital broadcast receiving apparatus in accordance with the present invention comprises, in a digital broadcast receiving apparatus which reproduces contents of a digital broadcast from a received signal of the digital broadcast and outputs the contents: a demodulator that demodulates digital data from the received signal of the digital broadcast; a reproduction unit that reproduces the contents of the digital broadcast from the digital data the demodulator demodulates; a detector that detects information about a difference between a first clock to which the demodulator synchronizes and a second clock to which the reproduction unit synchronizes; and an output controller that controls the output of the data reproduced by the reproduction unit so that the contents of the digital broadcast are output at a prescribed rate in accordance with the information about the difference between the first clock and the second clock the detector detects, wherein the detector further comprises: a first counter that counts clock pulses of the first clock which is synchronized with a transmission side; a second counter that counts clock pulses of the second clock simultaneously with the first counter; and a count difference calculating unit that calculates a difference between the count value the second counter counts at a time when the count value the first counter counts agrees with a reference count value and an ideal value of a count value of clock pulses of a clock synchronized with the transmission side, and that carries out cumulative addition of the difference every time the count value the first counter counts agrees with the reference count value, wherein the output controller further comprises: an interpolation ratio calculating unit that calculates an interpolation ratio for outputting the data the reproduction unit reproduces within a prescribed unit time in order to output the contents of the digital broadcast at a prescribed rate in accordance with the information about the difference between the first clock and the second clock the detector detects; and an interpolation processing unit that applies the interpolation processing to the data the reproduction unit reproduces at the interpolation ratio the interpolation ratio calculating unit calculates to vary a number of the data to be output within the prescribed unit time, and wherein the output controller: receives the cumulative addition value the count difference calculating unit calculates as information about the difference; and carries out control in a manner that the contents of the digital broadcast the reproduction unit reproduces are output at the prescribed rate in accordance with a compared result of the cumulative addition value with a prescribed threshold.

Advantages of the Invention

According to the present invention, it offers an advantage of being able to output the contents of the digital broadcast at the prescribed rate.

BEST MODE FOR CARRYING OUT THE INVENTION

The best mode for carrying out the invention will now be described with reference to the accompanying drawings to explain the present invention in more detail.

Embodiment 1

Figure 1:
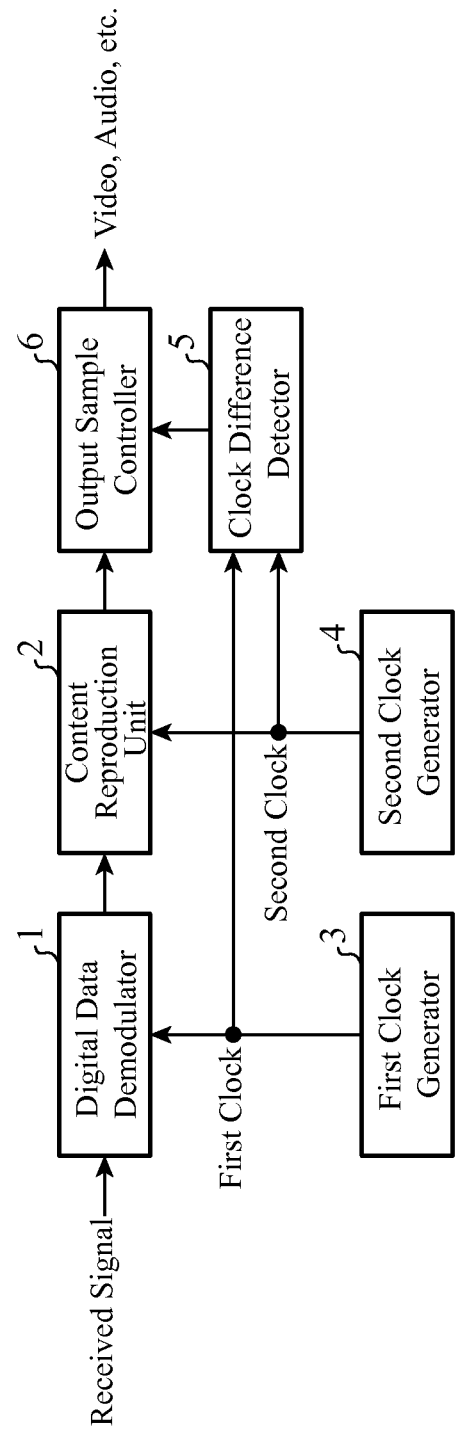
FIG. 1 is a block diagram showing a configuration of a digital broadcast receiving apparatus in accordance with the present invention.

FIG. 1 is a block diagram showing a configuration of a digital broadcast receiving apparatus in accordance with the present invention. The digital broadcast receiving apparatus shown in FIG. 1 is an apparatus that is mounted on a mobile object (such as a vehicle), and receives a digital broadcast (such as European Digital Radio Broadcast) in which the information about the reference time is not superposed on a data stream transmitted. The following description will be made using an example in which the contents of a digital broadcast a digital broadcast receiving apparatus in accordance with the present invention receives and reproduces are video and audio contents.

The digital broadcast receiving apparatus shown in FIG. 1 comprises as its functional components a digital data demodulator 1, a content reproduction unit 2, a first clock generator 3, a second clock generator 4, a clock difference detector 5 and an output sample controller 6.

The digital data demodulator 1 is a demodulator that accepts a signal received via an antenna, and demodulates a prescribed data stream from the received signal.

The content reproduction unit 2 is a reproduction unit that receives the data stream the digital data demodulator 1 demodulates, and reproduces video and audio contents by separating them from the data stream.

The first clock generator 3 generates a first clock which is the operating clock of the digital data demodulator 1, and supplies it to the digital data demodulator 1. In addition, the second clock generator 4 generates a second clock which is the operating clock of the content reproduction unit 2, and supplies it to the content reproduction unit 2. The clock difference detector 5 is a detector that receives the first clock the first clock generator 3 generates and the second clock the second clock generator 4 generates, and that detects information about the difference between the two.

Incidentally, it is assumed here that the first clock and the second clock differ from each other as in the case where a chip in which the digital data demodulator 1 and first clock generator 3 are built differs from a chip in which the content reproduction unit 2 and second clock generator 4 are built.

The output sample controller 6 is an output controller that controls, in accordance with the information about the difference between the first clock and the second clock the clock difference detector 5 detects, the output of the digital data representing the contents of the digital broadcast reproduced by the content reproduction unit 2.

Incidentally, the video data is delivered from the output sample controller 6 to a display controller not shown so that the display controller displays the video data on a display unit (display) not shown. In addition, the audio data is delivered from the output sample controller 6 to an audio output controller not shown so that the audio output controller carries out audio output through a sound output unit (speaker) not shown.

The display controller and audio output controller supply the video data and audio data to the display unit and sound output unit at a rate corresponding to the number of output data per unit time (referred to as the "output sample number" from now on) fed from the output sample controller 6, thereby providing them to a user. If the rate is a rate synchronized with that of the transmission side, they can provide the video and audio appropriately to the user without bringing about any malfunctioning like distortion.

In the digital broadcast receiving apparatus of the embodiment 1, the output sample controller 6 controls the output of the data reproduced by the content reproduction unit 2 in a manner that the contents of the digital broadcast are output at the prescribed rate in accordance with the information about the difference between the first clock and the second clock the clock difference detector 5 detects. In this way, it enables stable, consistent reproduction of the video and audio contents which are the contents of the digital broadcast.

Figure 2:
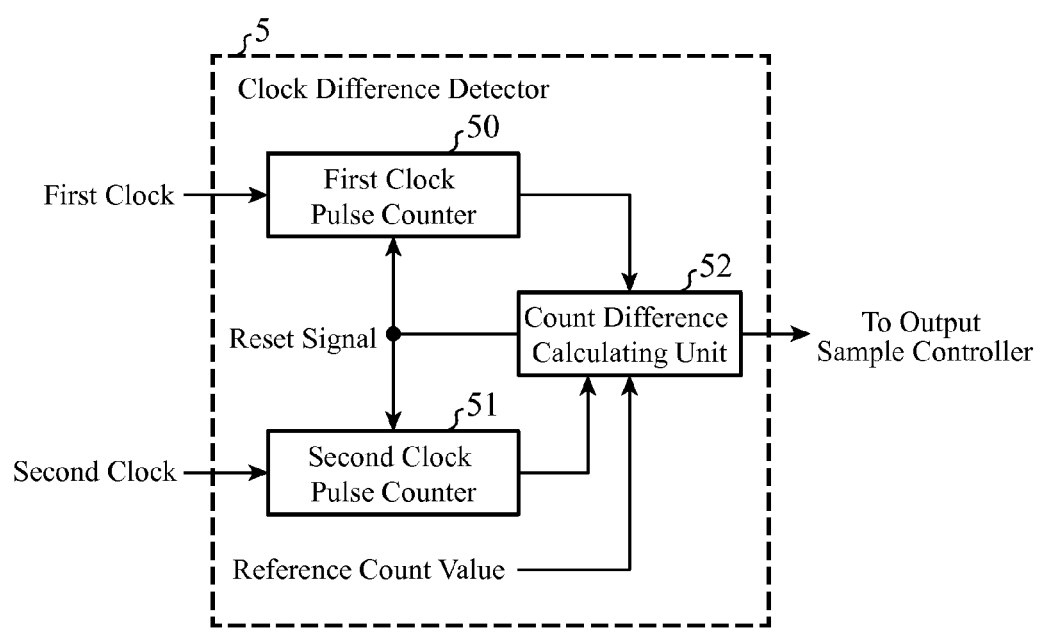
FIG. 2 is a block diagram showing a configuration of a clock difference detector of a digital broadcast receiving apparatus of an embodiment 1.

FIG. 2 is a block diagram showing a configuration of the clock difference detector of the digital broadcast receiving apparatus of the embodiment 1. In FIG. 2, the clock difference detector 5 comprises a first clock pulse counter 50, a second clock pulse counter 51 and a count difference calculating unit 52.

The first clock pulse counter 50 is a first counter that receives the first clock the first clock generator 3 generates, and counts its clock pulses.

In addition, the second clock pulse counter 51 is a second counter that receives the second clock the second clock generator 4 generates, and counts its clock pulses.

Incidentally, the first clock pulse counter 50 and the second clock pulse counter 51 start counting in response to a reset signal output from the count difference calculating unit 52, and successively supply the count values they count to the count difference calculating unit 52.

The count difference calculating unit 52 receives the count value the first clock pulse counter 50 counts, the count value the second clock pulse counter 51 counts and a reference count value, and detects the information about the difference between the first, clock and the second clock on the basis of the reference count value. More specifically, the count difference calculating unit 52 detects the count value of the second clock at the time when the count value of the first clock agrees with the reference count value, compares the detected count value with a prescribed value, and cumulatively adds the difference between the two. The cumulative addition value is referred to as a "clock difference cumulative value" from now on.

The foregoing prescribed value is an ideal value that is uniquely calculated in accordance with the reference count value, when the first clock is a clock synchronized with the transmission side and when the frequency of the second clock is known.

More specifically, the prescribed value corresponds to the ideal value of the count value of the clock pulses synchronized with the transmission side.

Accordingly, if the first clock synchronized with the transmission side synchronizes with the second clock, the output of the count difference calculating unit 52 is zero.

In addition, the reference count value is a count value that defines the cycle of detecting the difference of the second clock from the first clock. More specifically, the product of the period of the first clock and the reference count value represents the detection cycle of the difference of the second clock from the first clock (cycle of resetting the reference count duration for counting the clock pulses).

Incidentally, the clock difference cumulative value, which is the output of the clock difference detector 5, is proportional to the clock difference between the first, clock and the second clock, and according to the value, it is possible to correct the rate, at which the reproduced data from the content reproduction unit 2 is supplied to a post-stage component, to a desired rate.

Figure 3:
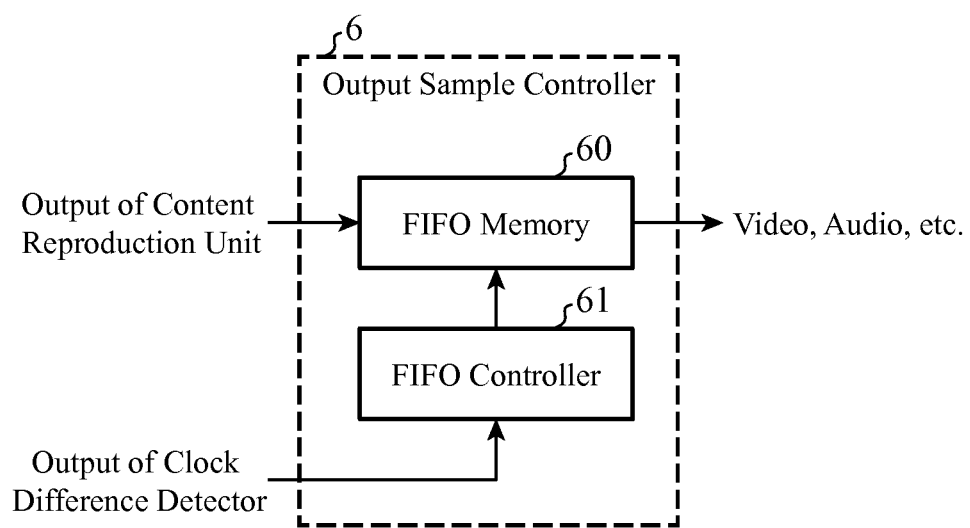
FIG. 3 is a block diagram showing a configuration of an output sample controller of the digital broadcast receiving apparatus of the embodiment 1.

FIG. 3 is a block diagram showing a configuration of the output sample controller of FIG. 1. In FIG. 3, the output sample controller 6 comprises a FIFO (First-In First-Out) memory 60 and a FIFO controller 61.

The FIFO memory 60 is a first-in, first-out memory that receives and stores the video and audio digital data reproduced by the content reproduction unit 2.

The FIFO controller 61 is a controller that controls the digital data stored in the FIFO memory 60 in such a manner as to be output at a prescribed rate in accordance with the clock difference cumulative value the clock difference detector 5 detects. Incidentally, the FIFO controller 61 controls the data rate in such a manner that when the output sample number of the FIFO memory 60 is less than the prescribed sample number, it compensates for the samples by using the data successively stored in the FIFO memory 60, and that when the output sample number is not less than the prescribed sample number, it delays the timing of outputting the data from the FIFO memory 60.

Next, the operation will be described.

Figure 4:
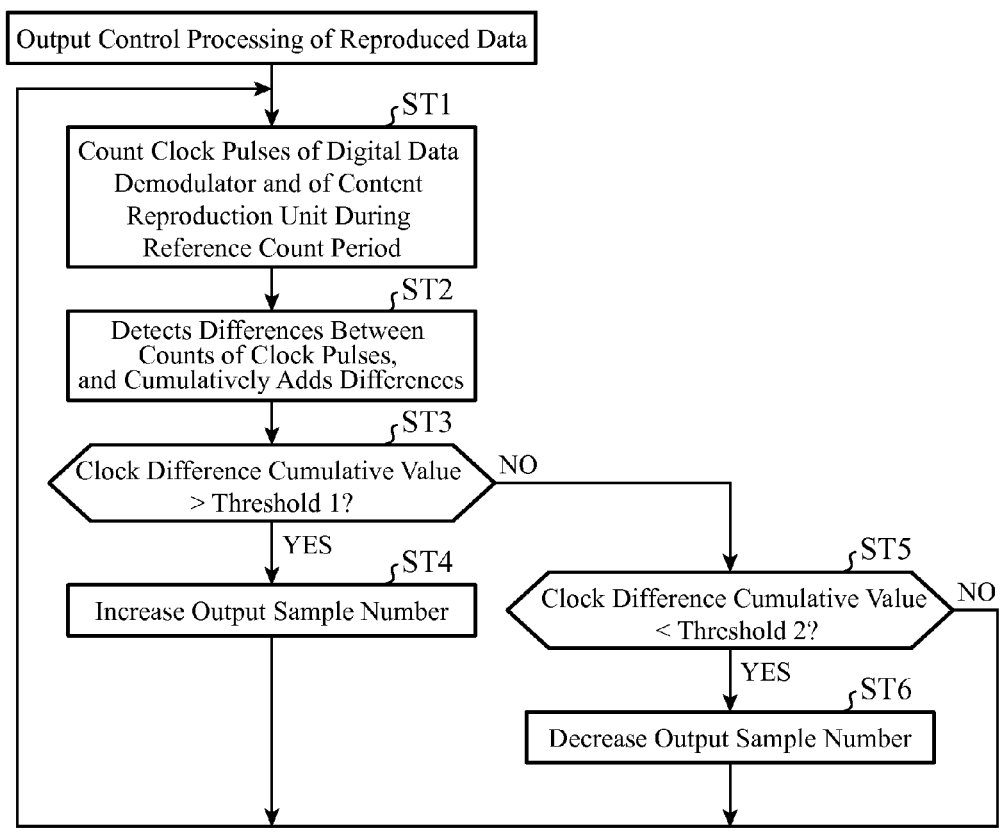
FIG. 4 is a flowchart showing the operation of the digital broadcast receiving apparatus of the embodiment 1.

FIG. 4 is a flowchart showing the operation of the digital broadcast receiving apparatus of the embodiment 1, which shows the output control processing of the reproduced data by the digital broadcast receiving apparatus of the embodiment 1. Incidentally, the output control processing of the reproduced data includes the following steps executed sequentially: clock count processing; cumulative addition processing of the clock difference; clock difference cumulative value decision processing; and output sample number control processing. In addition, after a series of the processing steps have been executed, the processing beginning from the clock count processing is executed again. The individual processing steps will be described in more detail below.

The clock count processing counts the clock pulses of the first clock to which the digital data demodulator 1 synchronizes, and the clock pulses of the second clock to which the content reproduction unit 2 synchronizes, for the reference count duration of counting the clock pulses defined by the reference count value.

More specifically, the first clock pulse counter 50 of the clock difference detector 5 starts counting the clock pulses of the first clock in response to the reset signal from the count difference calculating unit 52.

Likewise, the second clock pulse counter 51 starts counting the clock pulses of the second clock simultaneously with the first clock pulse counter 50 in response to the reset signal from the count difference calculating unit 52. The processing corresponds to step ST1.

The cumulative addition processing of a clock difference detects the information about the difference (the value corresponding to the difference) between the count value of the first clock pulses and the count value of the second clock pulses counted in the clock count processing, and obtains the clock difference cumulative value by cumulatively adding the value.

More specifically, the count difference calculating unit 52 detects the count value of the second clock pulses at the time when the count value of the first clock pulses agrees with the reference count value, calculates the difference between the count value and the prescribed value, and cumulatively adds the difference.

Incidentally, the prescribed value corresponds to the ideal value of the count value of the clock pulses when the clock synchronized with the transmission side agrees with the reference count value. The processing so far is step ST2.

The clock difference cumulative value decision processing decides on whether the clock difference cumulative value "is greater than a prescribed threshold 1", "is less than a prescribed threshold 2 (<threshold 1)", or "is not greater than the threshold 1 and not less than the threshold 2". Concretely, the FIFO controller 61 of the output sample controller 6 decides on whether the clock difference cumulative value detected by the clock difference detector 5 exceeds the prescribed threshold 1 or not (step ST3).

If the clock difference cumulative value exceeds the prescribed threshold. 1 (YES at step ST3), the FIFO controller 61 adjusts the rate by increasing the output sample number of the reproduced data stored in the FIFO memory 60 on the basis of a prescribed data block unit (step ST4). After that, it returns to the processing at step ST1, and executes the foregoing processing in order beginning from the clock count processing.

On the other hand, if the clock difference cumulative value is not greater than the prescribed threshold 1 (NO at step ST3), the FIFO controller 61 decides on whether the clock difference cumulative value detected by the clock difference detector 5 is less than the prescribed threshold 2 or not (step ST5).

If the clock difference cumulative value is less than the prescribed threshold 2 (YES at step ST5), the FIFO controller 61 adjusts the rate by decreasing the output sample number of the reproduced data stored in the FIFO memory 60 on the basis of the prescribed data block unit (step ST6). After that, it returns the processing to step ST1, and executes the foregoing processing beginning from the clock count processing.

If the clock difference cumulative value is not greater than the threshold 1 and is not less than the threshold. 2 (NO at step ST5), the FIFO controller 61 does not increase or decrease the output sample number fed from the FIFO memory 60, and causes the FIFO memory 60 to output the data in accordance with the input timing from the content reproduction unit 2. After that, it returns to the processing at step ST1, and executes the foregoing processing in order beginning from the clock count processing.

Figure 5:
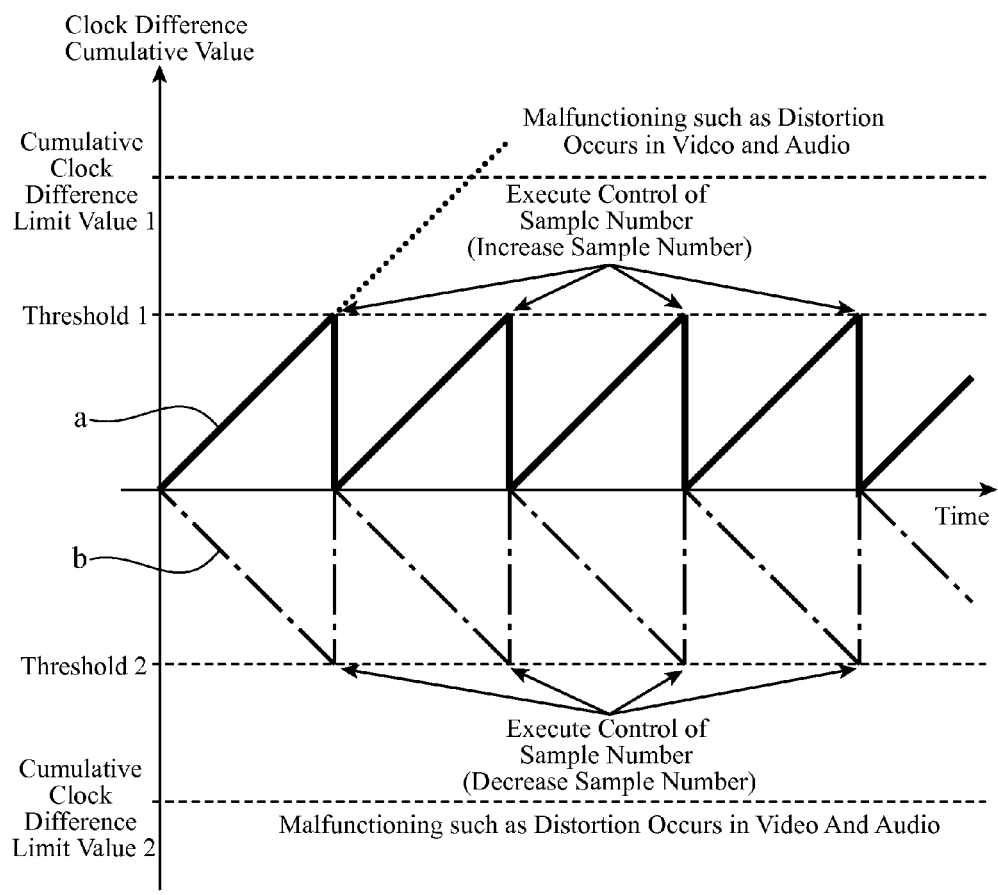
FIG. 5 is a diagram showing an outline of output sample number control in accordance with a clock difference cumulative value.

FIG. 5 is a diagram showing an outline of the output sample number control in accordance with the clock difference cumulative value, which shows relationships with the clock difference cumulative values with respect to the elapsed time when executing the processing of FIG. 4. In FIG. 5, thick lines a indicate time variation of the clock difference cumulative value, which corresponds to the case where the second clock is faster than the first clock. In addition, dash dotted lines b indicate the time variation of the clock difference cumulative value when the first clock is faster than the second clock.

Incidentally, the clock difference cumulative value is a cumulative value of the difference obtained by subtracting the prescribed value (the ideal value of the count value of the clock pulses of the clock synchronized with the transmission side (corresponding to the first clock)) from the count value of the clock pulses of the second clock.

For example, when the second clock is faster than the first clock, the clock difference cumulative value increases with time as shown by the thick lines a. At this time, the output sample controller 6 does not control the output sample number until the clock difference cumulative value reaches the threshold 1 so that the reproduced data from the content reproduction unit 2 which synchronizes to the second clock is stored on the basis of the prescribed data block unit, and is output at the rate higher than the prescribed rate of the transmission side.

When the clock difference cumulative value reaches the threshold 1, the output sample controller 6 carries out the control of increasing the output sample number, thereby adjusting the data output so as to agree with the prescribed rate of the transmission side. At this time, the clock difference cumulative value is initialized to zero, and the calculation of the clock difference cumulative value is started again. In this way, every time the clock difference cumulative value reaches the threshold 1, the control of the output sample number is executed.

Incidentally, a cumulative clock difference limit value 1 is a limit value of the clock difference cumulative value at which the video and audio which are the contents of the digital broadcast have malfunctioning such as distortion owing to the deviation of the output rate as shown by a broken line in FIG. 5 because the reproduced data from the content reproduction unit 2 is output continuously at the rate higher than the prescribed rate of the transmission side.

The threshold 1 is a threshold of the clock difference cumulative value which is determined within a range that can positively prevent malfunctioning considering a probability that the malfunctioning can occur owing to the deviation of the output rate before reaching the cumulative clock difference limit value 1.

Likewise, when the first clock is faster than the second clock, the clock difference cumulative value increases with time as indicated by the dash dotted line b. At this time, the output sample controller 6 stores the reproduced data from the content reproduction unit 2 on the basis of the prescribed data block unit until the clock difference cumulative value reaches the threshold 2, and outputs the data at the rate lower than the prescribed rate of the transmission side. When the clock difference cumulative value reaches the threshold 2, the output sample controller 6 carries out control of reducing the output sample number, and adjusts the data output so as to agree with the prescribed rate of the transmission side. At this time, the clock difference cumulative value is initialized to zero, and the calculation of the clock difference cumulative value is started again. In this way, every time the clock difference cumulative value reaches the threshold 2, the control of the output sample number is executed.

Incidentally, a cumulative clock difference limit value 2 is a limit value of the clock difference cumulative value at which the video and audio which are the contents of the digital broadcast have malfunctioning such as distortion owing to the difference of the output rate because the reproduced data from the content reproduction unit 2 is output continuously at the rate lower than the prescribed rate of the transmission side.

The threshold 2 is a threshold of the clock difference cumulative value which is determined within a range that can positively prevent malfunctioning considering a probability that the malfunctioning can occur owing to the deviation of the output rate before reaching the cumulative clock difference limit value 2.

As described above, as long as the control of the output sample number is carried out, the output sample number is increased or decreased, and the output rate is unstable, which presents the possibility of causing some distortion of the video or audio during that time. Accordingly, it is possible to set the reference count value in a manner that the detection cycle given by the product of the period of the first clock and the reference count value becomes shorter than the prescribed frame length specifically defined for the digital broadcast the digital broadcast receiving apparatus in accordance with the present invention receives.

This enables detecting the clock difference at a cycle shorter than the prescribed frame length, and hence enables the output sample controller 6 to control the output at a cycle shorter than the frame length. Accordingly, it can secure a frame that does not undergo the control of the output sample number in the data stream.

In other words, it can secure a frame that is free from the deterioration of the contents presented.

More concretely, the reference count value can be set in such a manner that the detection cycle, which is given by the product of the period of the first clock and the reference count value, becomes 1/N of the frame length (N is a natural number greater than 1). Since this enables detecting the clock difference in a cycle shorter than the prescribed frame length, it becomes possible to secure a frame, the output sample number of which is not controlled, in the data stream. This enables securing a frame that is free from the deterioration of the contents presented. In addition, since setting the detection cycle at 1/N of the frame length enables a simple circuit that counts only every N times to implement the function, it becomes possible to reduce the circuit scale or the number of calculations of the signal processing.

As described above, according to the present embodiment 1, the digital broadcast receiving apparatus with the configuration as shown in FIG. 1 demodulates the digital data from the received signal of a digital broadcast; reproduces the contents of the digital broadcast from the demodulated digital data; detects the information about the difference between the first clock that synchronizes with the demodulation and the second clock that synchronizes with the reproduction; and controls in a manner that the contents of the digital broadcast the content reproduction unit 2 reproduces are output at the prescribed rate in accordance with the information about the difference between the first clock and the second clock.

This makes it possible to output the data reproduced from the data stream at the prescribed rate even though the data stream demodulated from the received signal does not have the reference time inserted, and the content reproduction unit 2 operates at the clock different from the pre-stage signal processing (demodulation processing). This makes it unnecessary for the demodulation of the digital data and the reproduction of the contents to be implemented in a single chip to operate in synchronization to the same clock, thereby being able to increase the degree of the freedom of the configuration of the digital broadcast receiving apparatus.

In addition, according to the present embodiment 1, the clock difference detector 5 comprises the first clock pulse counter 50 that counts the clock pulses of the first clock synchronized with the transmission side; the second clock pulse counter 51 that counts the clock pulses of the second clock simultaneously with the first clock pulse counter 50; and the count difference calculating unit 52 that calculates the difference between the count value the second clock pulse counter 51 counts and the ideal value of the count value of the clock pulses synchronized with the transmission side at the time when the count value the first clock pulse counter 50 counts agrees with the reference count value, and cumulatively adds the difference every time the count value the first clock pulse counter 50 counts agrees with the reference count value as the clock difference cumulative addition value, wherein the output sample controller 6 receives the clock difference cumulative addition value the count difference calculating unit 52 calculates as the information about the difference, and carries out control in such a manner that the contents of the digital broadcast the content reproduction unit 2 reproduces are output at the prescribed rate in accordance with the result of comparing the clock difference cumulative addition value with the prescribed threshold.

With the foregoing configuration, it can output the data reproduced from the data stream at the prescribed rate even if the data stream demodulated from the received signal does not have the reference time inserted, and the content reproduction unit 2 operates according to the clock different from that of the pre-stage signal processing (demodulation processing).

Furthermore, according to the present embodiment 1, the output sample controller 6 comprises the FIFO (first-in, first-out) memory 60 that sequentially stores the data the content reproduction unit 2 reproduces; and the FIFO controller 61 that controls the output of the data from the FIFO memory 60 in such a manner that the contents of the digital broadcast is output at the prescribed rate in accordance with the information about the difference between the first clock and the second clock the clock difference detector 5 detects.

With the configuration, it can output the data reproduced from the data stream at the prescribed rate even if the data stream demodulated from the received signal does not have the reference time inserted, and the content reproduction unit 2 operates according to the clock different from that of the pre-stage signal processing (demodulation processing).

Furthermore, according to the present embodiment 1, the count difference calculating unit 52 uses, as the prescribed threshold to be compared with the clock difference cumulative addition value, a plurality of thresholds (thresholds 1 and 2) corresponding to the individual cases where the first clock is faster than the second clock, and the second clock is faster than the first clock. This enables appropriate control of the output sample number corresponding to both the cases where the first clock is faster than the second clock and the second clock is faster than the first clock.

Furthermore, according to the present embodiment 1, since the count difference calculating unit 52 uses the reference count value that is set in such a manner that the cycle, in which the reference count value agrees with the count value of the first clock pulse counter 50, becomes shorter than the frame length of the data stream demodulated from the received signal of a digital broadcast, the present embodiment 1 can secure among the frames in the data stream a frame as to which the output sample controller 6 does not control the output sample number. This enables securing the frame free from the deterioration of the contents presented.

Furthermore, according to the present embodiment 1, since it sets the cycle, in which the reference count value agrees with the count value of the first clock pulse counter 50, at the cycle of 1/N of the frame length (N is a natural number greater than one), it can secure the frame as to which the output sample controller 6 does not control the output sample number in the frames in the data stream. This enables securing a frame as to which the contents presented are free from the deterioration. In addition, since it can be implemented with a simple circuit that only counts every N times, it becomes possible to reduce the circuit scale or the number of calculations of the signal processing.

Embodiment 2

Figure 6:
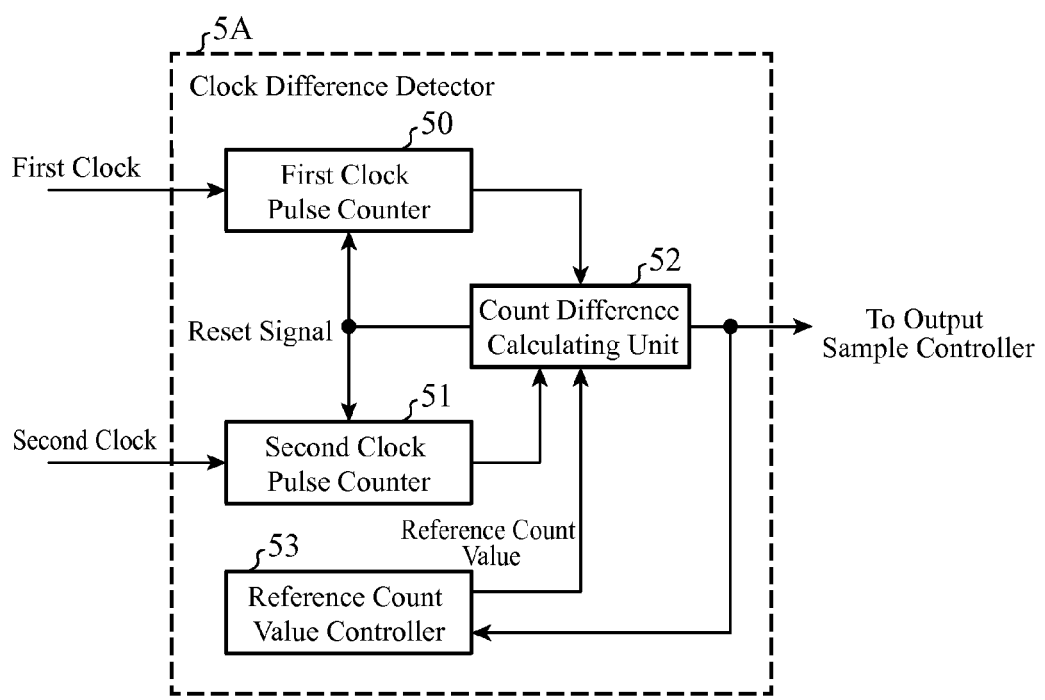
FIG. 6 is a block diagram showing a configuration of a clock difference detector of a digital broadcast receiving apparatus of an embodiment 2 in accordance with the present invention.

FIG. 6 is a block diagram showing a configuration of a clock difference detector of a digital broadcast receiving apparatus of an embodiment 2 in accordance with the present invention. As shown in FIG. 6, the clock difference detector 5A of the embodiment 2 comprises a reference count value controller 53 added to the configuration of FIG. 2 shown in the embodiment 1. The reference count value controller 53 has a function of dynamically altering the reference count value in accordance with the clock difference cumulative addition value the count difference calculating unit 52 calculates. As described in the embodiment 1, the reference count value is a value that defines the cycle in which the difference of the second clock from the first clock is detected. Incidentally, in FIG. 6, since the same components as those of FIG. 2 are designated by the same reference numerals, their description will be omitted.

The reference count value controller 53, when the clock difference cumulative value the count difference calculating unit 52 calculates is greater than a prescribed upper limit threshold, for example, alters the reference count value in such a manner that it becomes smaller than the previous value. Thus, when the clock difference cumulative value is large, that is, when the difference between the first clock and the second clock is large, it reduces the detection cycle defined by the reference count value (corresponding to the cycle of controlling the output sample number) and increases the detection frequency (corresponding to the control frequency of the output sample number), thereby enabling the stable, consistent output of the contents.

In addition, when the clock difference cumulative value is not greater than the prescribed upper limit threshold and is greater than a prescribed lower limit, threshold, the reference count value is maintained at the previous value.

If a decision is made from the clock difference cumulative value that the difference between the first clock and the second clock is so small that the control of the output sample number is unnecessary, the reference count value can be made greater than the previous value to increase the detection cycle.

Furthermore, if the clock difference cumulative value is less than the prescribed lower limit threshold, and the difference between the first clock and the second clock is large, the detection cycle is shortened by altering the reference count value in such a manner that it becomes less than the previous value as mentioned above.

As described above, according to the present embodiment 2, the clock difference detector 5A comprises the reference count value controller 53 that dynamically alters the reference count value in accordance with the clock difference cumulative addition value the count difference calculating unit 52 calculates, and the reference count value controller 53 alters the reference count value in such a manner that when the clock difference cumulative addition value the count difference calculating unit 52 calculates is greater than the prescribed threshold, it shortens the cycle in which the reference count value agrees with the count value the first clock pulse counter 50 counts. With the configuration, when the difference between the first clock and the second clock is large, the present embodiment 2 can increase the frequency of controlling the output sample number by shortening the detection cycle defined by the reference count value, thereby being able to perform the stable, consistent output of the contents.

Embodiment 3

Figure 7:
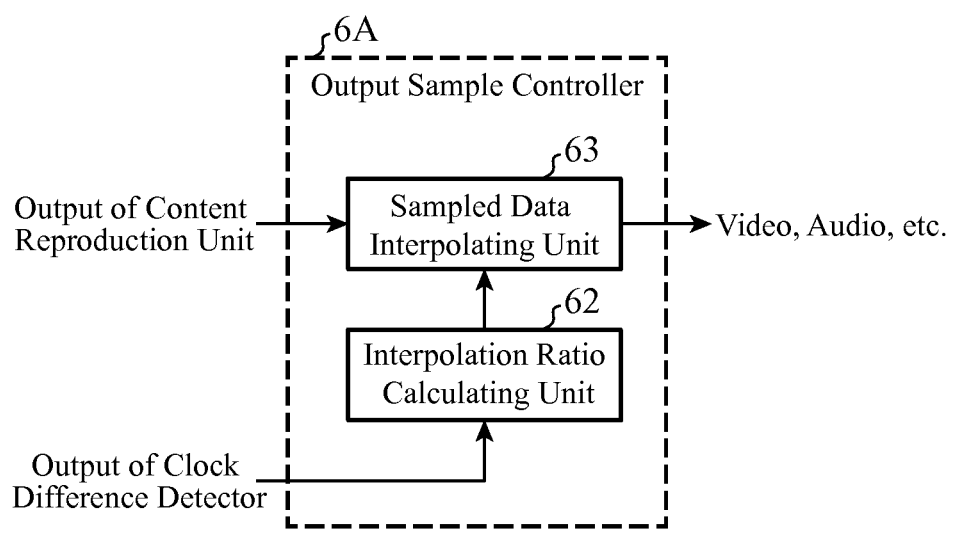
FIG. 7 is a block diagram showing a configuration of an output sample controller of a digital broadcast receiving apparatus of an embodiment 3 in accordance with the present invention.

FIG. 7 is a block diagram showing a configuration of an output sample controller of a digital broadcast receiving apparatus of an embodiment 3 in accordance with the present invention. The output sample controller 6A of the embodiment 3 comprises an interpolation ratio calculating unit 62 and a sampled data interpolating unit 63 instead of the configuration of FIG. 3 shown in the embodiment 1. The interpolation ratio calculating unit 62 calculates an interpolation ratio for outputting the data reproduced by the content reproduction unit 2 within a prescribed unit time so that the contents of the digital broadcast is output at the prescribed rate in accordance with the information about the difference between the first clock and the second clock (clock difference cumulative value) the clock difference detector 5 detects. In addition, the sampled data interpolating unit 63 is an interpolation processing unit that performs the interpolation processing at the interpolation ratio the interpolation ratio calculating unit 62 calculates, and varies the number of data which is reproduced by the content reproduction unit 2 and is to be output within the prescribed unit time.

The output sample controller 6 of the embodiment 1 controls the output sample number by adjusting the timing of outputting the reproduced data from the FIFO memory 60.

In the present embodiment 3, the sampled data interpolating unit 63 generates the data with the output sample number corresponding to the interpolation ratio calculated by the interpolation ratio calculating unit 62 and outputs the data. Accordingly, it can control the output sample number more accurately in accordance with the interpolation ratio.

As described above, according to the present embodiment 3, the output sample controller 6A comprises the interpolation ratio calculating unit 62 that calculates the interpolation ratio for outputting data reproduced by the content reproduction unit 2 within a prescribed unit time so as to output the contents of the digital broadcast at the prescribed rate in accordance with the information about the difference between the first clock and the second clock the clock difference detector 5 detects; and the sampled data interpolating unit 63 that performs the interpolation processing at the interpolation ratio the interpolation ratio calculating unit 62 calculates, and varies the number of data which is reproduced by the content reproduction unit 2 and is output within the prescribed unit time.

With the foregoing configuration, it can output the data reproduced from the data stream at the prescribed rate even if the data stream demodulated from the received signal does not have the reference time inserted, and the content reproduction unit 2 operates according to the clock different from that of the pre-stage signal processing (demodulation processing).

The output sample controller 6A of the embodiment 3 is applicable to the digital broadcast receiving apparatus with the clock difference detector 5 shown in FIG. 2 or to the digital broadcast receiving apparatus with the clock difference detector 5A shown in FIG. 6. Both cases can offer the same advantages as the foregoing embodiment 1.

Incidentally, it is to be understood that a free combination of the individual embodiments, variations of any components of the individual embodiments or removal of any components of the individual embodiments is possible within the scope of the present invention.

INDUSTRIAL APPLICABILITY

A digital broadcast receiving apparatus in accordance with the present invention is capable of outputting the contents restored from the received signal of a digital broadcast at the prescribed rate even when the information about the reference time is not superimposed on the data stream. Accordingly, it is suitable for an onboard digital broadcast receiving apparatus capable of receiving digital broadcasts with various specifications in accordance with places where a vehicle travels.

DESCRIPTION OF REFERENCE SYMBOLS 1 digital data demodulator; 2 content reproduction unit; 3 first clock generator; 4 second clock generator; 5, 5A clock difference detector; 6, 6A output sample controller; 50 first clock pulse counter; 51 second clock pulse counter; 52 count difference calculating unit; 53 reference count value controller; 60 FIFO memory; 61 FIFO controller; 62 interpolation ratio calculating unit; 63 sampled data interpolating unit.

What is claimed is:

1. A digital broadcast receiving apparatus which reproduces contents of a digital broadcast from a received signal of the digital broadcast and outputs the contents, the digital broadcast receiving apparatus comprising:
a demodulator that demodulates digital data from the received signal of the digital broadcast;
a reproduction unit that reproduces the contents of the digital broadcast from the digital data the demodulator demodulates;
a detector that detects information about a difference between a first clock to which the demodulator synchronizes and a second clock to which the reproduction unit synchronizes; and
an output controller that carries out control in a manner that the contents of the digital broadcast the reproduction unit reproduces are output at a prescribed rate in accordance with the information about the difference between the first clock and the second clock the detector detects, wherein the detector further comprises:
a first counter that counts clock pulses of the first clock which is synchronized with a transmission side;
a second counter that counts clock pulses of the second clock simultaneously with the first counter; and
a count difference calculating unit that calculates a difference between the count value the second counter counts at a time when the count value the first counter counts agrees with a reference count value and an ideal value of a count value of clock pulses of a clock synchronized with the transmission side, and that carries out cumulative addition of the difference every time the count value the first counter counts agrees with the reference count value, wherein the output controller further comprises:
an interpolation ratio calculating unit that calculates an interpolation ratio for outputting the data the reproduction unit reproduces within a prescribed unit time in order to output the contents of the digital broadcast at a prescribed rate in accordance with the information about the difference between the first clock and the second clock the detector detects; and an interpolation processing unit that applies the interpolation processing to the data the reproduction unit reproduces at the interpolation ratio the interpolation ratio calculating unit calculates to vary a number of the data to be output within the prescribed unit time, and wherein the output controller:

receives the cumulative addition value the count difference calculating unit calculates as information about the difference; and carries out control in a manner that the contents of the digital broadcast the reproduction unit reproduces are output at the prescribed rate in accordance with a compared result of the cumulative addition value with a prescribed threshold.

2. The digital broadcast receiving apparatus according to claim 1, wherein
the count difference calculating unit uses, as the prescribed threshold to be compared with the cumulative addition value, a plurality of thresholds corresponding to a case where the first clock is faster than the second clock and to a case where the second clock is faster than the first clock, respectively.

3. The digital broadcast receiving apparatus according to claim 1, wherein
the count difference calculating unit uses the reference count value that is set in a manner that a period in which the reference count value agrees with the count value the first counter counts becomes shorter than a frame length of a data stream demodulated from the received signal of the digital broadcast.

4. The digital broadcast receiving apparatus according to claim 3, wherein
the reference count value has a period of 1/N the frame length (where N is a natural number greater than one) as the period in which the reference count value agrees with the count value the first counter counts.

5. The digital broadcast receiving apparatus according to claim 1, wherein the detector comprises:
a reference count value controller that alters the reference count value dynamically in accordance with the cumulative addition value the count difference calculating unit calculates, and wherein the reference count value controller:
alters, if the cumulative addition value the count difference calculating unit calculates is greater than a prescribed threshold, the reference count value in a manner as to reduce the period in which the reference count value agrees with the count value the first counter counts.

6. A digital broadcast receiving method which reproduces contents of a digital broadcast from a received signal of the digital broadcast and outputs the contents, the digital broadcast receiving method comprising:

a step of demodulating, by a demodulator, digital data from the received signal of the digital broadcast;

a step of reproducing, by a reproduction unit, the contents of the digital broadcast from the digital data demodulated;

a step of detecting, by a detector, information about a difference between a first clock which synchronizes with the demodulation and a second clock which synchronizes with the reproduction; and a step of carrying out, by an output controller, control in a manner that the contents of the digital broadcast reproduced are output at a prescribed rate in accordance with the information about the difference between the first clock and the second clock; wherein the detector further comprises:

a first counter that counts clock pulses of the first clock which is synchronized with a transmission side;

a second counter that counts clock pulses of the second clock simultaneously with the first counter; and a count difference calculating unit that calculates a difference between the count value the second counter counts at a time when the count value the first counter counts agrees with a reference count value and an ideal value of a count value of clock pulses of a clock synchronized with the transmission side, and that carries out cumulative addition of the difference every time the count value the first counter counts agrees with the reference count value, wherein the output controller further comprises:

an interpolation ratio calculating unit that calculates an interpolation ratio for outputting the data the reproduction unit reproduces within a prescribed unit time in order to output the contents of the digital broadcast at a prescribed rate in accordance with the information about the difference between the first clock and the second clock the detector detects; and an interpolation processing unit that applies the interpolation processing to the data the reproduction unit reproduces at the interpolation ratio the interpolation ratio calculating unit calculates to vary a number of the data to be output within the prescribed unit time, and wherein the output controller:

receives the cumulative addition value the count difference calculating unit calculates as information about the difference; and carries out control in a manner that the contents of the digital broadcast the reproduction unit reproduces are output at the prescribed rate in accordance with a compared result of the cumulative addition value with a prescribed threshold.

* * * * *